United States Patent
Bates et al.

(10) Patent No.: US 6,543,049 B1
(45) Date of Patent: Apr. 1, 2003

(54) RANKED BREAK POINTS AND METHOD FOR DEBUGGING A COMPUTER PROGRAM

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,619

(22) Filed: Sep. 3, 1999

(51) Int. Cl.[7] .................................................. G06F 9/45
(52) U.S. Cl. ......................................................... 717/129
(58) Field of Search ........................................... 717/129

(56) References Cited

U.S. PATENT DOCUMENTS

| | | | | |
|---|---|---|---|---|
| 5,129,078 A | * | 7/1992 | Groves et al. | 710/36 |
| 5,140,671 A | * | 8/1992 | Hayes et al. | 706/60 |
| 5,379,301 A | * | 1/1995 | Sato et al. | 717/129 |
| 5,488,688 A | * | 1/1996 | Gonzales et al. | 714/34 |
| 5,548,717 A | * | 8/1996 | Wooldridge et al. | 717/129 |
| 5,838,975 A | * | 11/1998 | Abramson et al. | 717/129 |
| 5,889,981 A | * | 3/1999 | Betker et al. | 712/227 |
| 6,077,312 A | * | 6/2000 | Bates et al. | 717/129 |
| 6,240,545 B1 | * | 5/2001 | Carmichael et al. | 717/129 |

OTHER PUBLICATIONS

Wahbe et al., Practical Data Breakpoints . . . , 1993, ACM, pp. 1–12.*
Keehnemann et al., Towards Target Level Testing and Debugging . . . , 1993, ACM, pp. 288–298.*
Kacsuk, Systematic Debugging . . . , not dated, ACM, pp. 1–14.*
Koch et al., Breakpoints and Breakpoint Detection . . . , 1996, IEEE, pp. 26–31.*
Miller et al., Breakpoints and Halting . . . , 1998, IEEE, pp. 316–323.*

* cited by examiner

*Primary Examiner*—Kakali Chaki
*Assistant Examiner*—John Q. Chavis
(74) *Attorney, Agent, or Firm*—Derek P. Martin; Martin & Associates, LLC

(57) ABSTRACT

Ranked breakpoints are defined in a computer program that allow a debugger to determine whether or not to halt execution of the computer program when a ranked breakpoint is encountered based on the rank of the breakpoint compared to a threshold rank. In a preferred embodiment, the threshold rank is the rank of a RunTo function, and the ranked breakpoints only halt execution of the computer program if their rank is higher than the threshold rank of the RunTo function. The present invention thus provides a mechanism for ignoring some or all breakpoints in a computer program when performing debugger functions, such as a RunTo function.

23 Claims, 8 Drawing Sheets

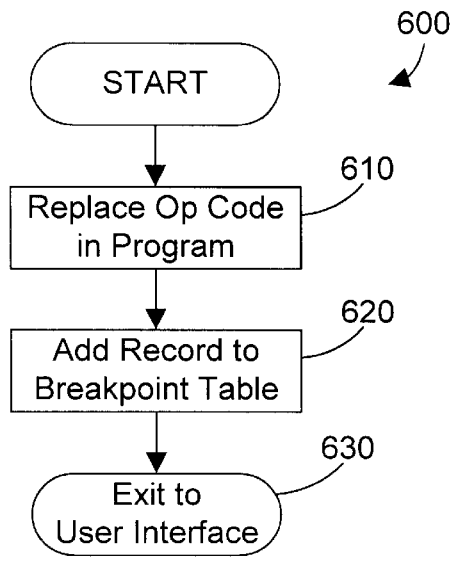
FIG. 6
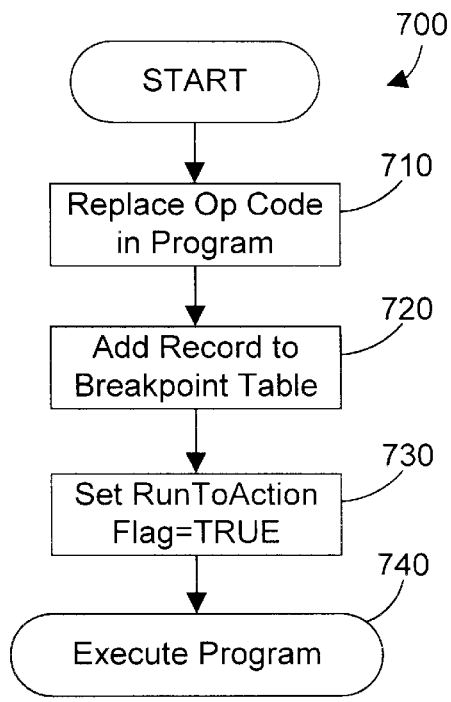
FIG. 7
| | Address | Op Code | RunTo Flag | Rank |
|---|---|---|---|---|
| 810A— | 00000460 | 39800001 | 0 | 10 |
| 810B— | 00000478 | 39000004 | 1 | 10 |
| 810C— | 00000470 | 39200003 | 0 | 10 |
FIG. 8

Source Code main(int argc, char *argv[])
{ int xx;

| Address | Op Code | Assembly Code | Label |
|---|---|---|---|
| 00000460 | 39800001 | ADDI 12,0,1 | 1 |
| 00000464 | 919FFFE0 | STW 12, 0XFFE0 (31) | |
| 00000468 | 39400002 | ADDI 10,0,2 | 2 |
| 0000046C | 915FFFE0 | STW 10, 0XFFE0 (31) | |
| 00000470 | 39200003 | ADDI 9,0,3 | 3 |
| 00000474 | 913FFFE0 | STW 9, 0XFFE0 (31) | |
| 00000478 | 39000004 | ADDI 8,0,4 | 4 |
| 0000047C | 911FFFE0 | STW 8, 0XFFFE0 (31) | |

FIG. 11

| Address | Op Code | Assembly Code | Label |
|---|---|---|---|
| 00000460 | 39800001 | ADDI 12,0,1 | 1 |
| 00000464 | 919FFFE0 | STW 12, 0XFFE0 (31) | |
| 00000468 | 39400002 | ADDI 10,0,2 | 2 |
| 0000046C | 915FFFE0 | STW 10, 0XFFE0 (31) | |
| 00000470 | 3F200003 | TRAP 9,0,3 | 3 |
| 00000474 | 913FFFE0 | STW 9, 0XFFE0 (31) | |
| 00000478 | 39000004 | ADDI 8,0,4 | 4 |
| 0000047C | 911FFFE0 | STW 8, 0XFFFE0 (31) | |

FIG. 12

| Address | Op Code | Assembly Code | Label |
|---|---|---|---|
| 00000460 | 3F800001 | TRAP 12,0,1 | 1 |
| 00000464 | 919FFFE0 | STW 12, 0XFFE0 (31) | |
| 00000468 | 39400002 | ADDI 10,0,2 | 2 |
| 0000046C | 915FFFE0 | STW 10, 0XFFE0 (31) | |
| 00000470 | 39200003 | ADDI 9,0,3 | 3 |
| 00000474 | 913FFFE0 | STW 9, 0XFFE0 (31) | |
| 00000478 | 3F000004 | TRAP 8,0,4 | 4 |
| 0000047C | 911FFFE0 | STW 8, 0XFFFE0 (31) | |

FIG. 13

RANKED BREAK POINTS AND METHOD FOR DEBUGGING A COMPUTER PROGRAM

BACKGROUND OF THE INVENTION

1. Technical Field

This invention generally y relates to computer programming and more specifically relates to mechanisms and methods for debugging a computer program.

2. Background Art

Since the d awn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modem programming environments include a debugger that provides tools for testing and debugging a computer program. Known debuggers allow the user to set one or more breakpoints in the computer program, which are points where the execution of the computer program is stopped so that the state of the program can be examined to verify that the program executed as designed. In debugging a sophisticated program, the user may specify many breakpoints to assure that the code is functioning properly.

Another function that many known debuggers provide is a "RunTo" function that allows a user to select an instruction in the computer program and "run to" that instruction. Known RunTo functions work fine when no breakpoints have been defined in a computer program. However, when one or more breakpoints have been defined, the debugger will stop at the first breakpoint it encounters, which effectively aborts the RunTo function. The user can always resume by selecting the RunTo function again for the same instruction, but if another breakpoint is encountered before the selected instruction, the debugger halts again and aborts the RunTo function. In a program that has many breakpoints defined, a user may have to re-start the RunTo function many times in order to get the program to run to the selected instruction. This process of being interrupted by breakpoints when performing a RunTo function is frustrating for users of the debugger.

One way to avoid stopping at breakpoints is to disable or remove the breakpoints that are encountered before the RunTo instruction is encountered. However, known debuggers only allow creating and deleting individual breakpoints, and some additionally allow turning on (enabling) and turning off (disabling) individual breakpoints. Thus, if there are 50 breakpoints that may be encountered before the selected RunTo instruction, the user would have to manually remove or disable each of the 50 breakpoints. This approach also requires that the user knows all possible paths of program flow, and remove or disable breakpoints in all possible paths. Needless to say, this process of manually disabling or removing breakpoints for the sake of running a RunTo function without interruption is an expensive price to pay when debugging a complex program. One could conceivably do a global clear or disable of all breakpoints, but this approach would require the user to re-establish or re-enable each breakpoint one at a time. If the user has spent considerable time setting up breakpoints, the last thing he or she wants to do is to delete or disable all of them. Without a mechanism and method for performing a RunTo command without stopping at every breakpoint, the computer industry will continue to suffer from inefficient methods and tools for debugging computer programs.

DISCLOSURE OF INVENTION

According to the present invention, ranked breakpoints are defined in a computer program that allow a debugger to determine whether or not to halt execution of the computer program when a ranked breakpoint is encountered based on the rank of the breakpoint compared to a threshold rank. In a preferred embodiment, the threshold rank is the rank of a RunTo function, and the ranked breakpoints only halt execution of the computer program if their rank is higher than the threshold rank of the RunTo function. The present invention thus provides a mechanism for ignoring some or all breakpoints in a computer program when performing debugger functions, such as a RunTo function.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 6 is a flow diagram of a method implemented by the breakpoint manager of FIG. 3 for setting a ranked breakpoint;

FIG. 7 is a flow diagram of a method implemented by the breakpoint manager of FIG. 3 for setting a RunTo breakpoint;

FIG. 8 is a block diagram showing a breakpoint table in accordance with one specific implementation in accordance with the preferred embodiments;

FIG. 10 is a sample portion of source code for illustrating the concepts of ranked breakpoints;

FIG. 11 is a sample portion of object and assembly code corresponding to the source code portion in FIG. 10;

FIG. 12 is the sample code portion of FIG. 11 with a TRAP instruction inserted at label 3 to generate a breakpoint when the TRAP instruction is executed; and FIG. 13 is the sample code portion of FIG. 11 with a TRAP instruction inserted at label 1 to generate a breakpoint and a TRAP instruction inserted at label 4 to generate a RunTo breakpoint.

BEST MODE FOR CARRYING OUT THE INVENTION

Figure 1:
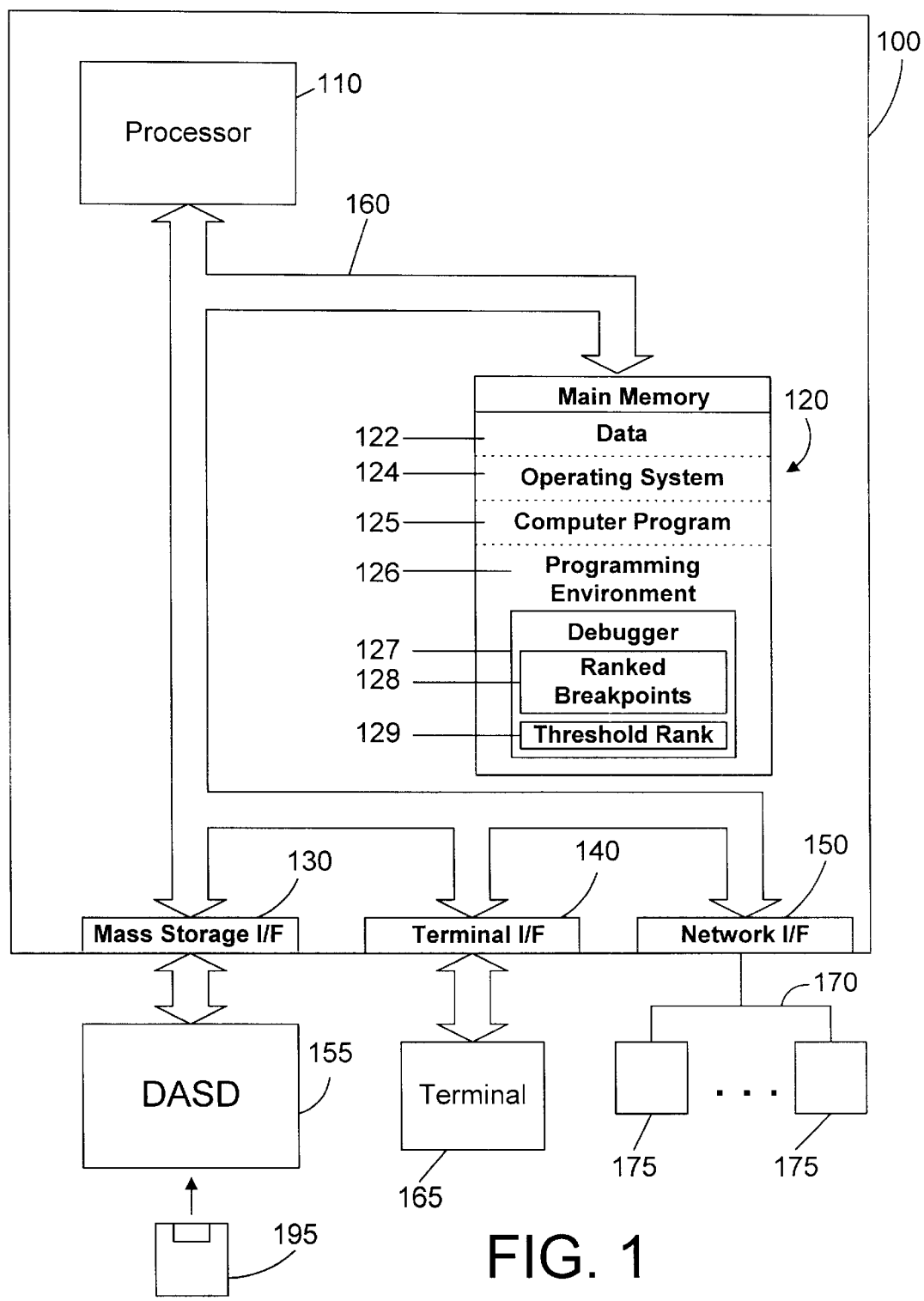
FIG. 1 is a block diagram of an apparatus in accordance with the preferred embodiments of the present invention.

The present invention is used in a programming environment for developing computer programs. For those who are not familiar with software development techniques, the brief overview below provides background information that will help the reader to understand the present invention.

1. Overview

Modern Programming Environments

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that make up operational codes (known as op codes) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Once the machine-readable instructions have been generated, the computer program may be run on the computer system it was designed for.

Computer programs typically include one or more program variables that contain data of interest. These variables are typically represented by text labels in high-level and intermediate code computer programs. The concept of program variables is well known in the art.

Modem programming environments may provide many different combinations of features. For example, most programming environments include an editor or browser that displays source code to the programmer on a display device. A compiler is used, as explained above, to generate machine code from source code. A linker may also be included to allow sub-portions of the program to be separately compiled and linked together after compilation. Some programming environments include target hardware, which is the hardware on which the computer program is intended to run. Others may provide a simulator in software to "run" the code to simulate how the target hardware would respond to the computer program. Most modem programming environments also provide a debugger to help a programmer to locate problems in a computer program.

Debugging a Computer Program

For a computer program of any complexity, the program will likely not perform exactly as intended due to programmer errors, known as "bugs", in the computer program. To help a programmer locate the bugs in his or her program, most modem programming environments provide a debugger that gives the programmer a variety of different tools for locating bugs. For example, a typical debugger includes a breakpoint capability that stops the execution of the program when a specified event occurs. Once the program execution is stopped, the debugger typically allows the programmer to examine memory and status information to determine whether or not the program is in the proper state. A debugger may also allow a programmer to specify conditions and run a "program trace", which writes to memory a list of all events of interest to the programmer without stopping the execution of the code. The present invention applies to any mechanism or system for debugging a computer program, whether presently known or developed in the future.

2. Detailed Description

According to the preferred embodiments of the present invention, ranked breakpoints allow a user to perform a RunTo function by setting the rank of the RunTo function greater than or equal to the rank of intervening breakpoints. If a breakpoint is an important one, its rank can be set high enough to halt execution of the computer program if the breakpoint is encountered during a RunTo function. In this manner a RunTo function can selectively set a rank that will ignore a majority of the breakpoints while still halting execution on the most important breakpoint(s). The capability greatly enhances the productivity of a programmer (referred to herein as the "user") because a debugger performing a RunTo function will not halt at each defined break point.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a computer program 125, and a programming environment 126 that includes a debugger 127 that allows defining one or more ranked breakpoints 128 and a threshold rank 129 in accordance with the preferred embodiments. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, computer program 125, and programming environment 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 125 represents a computer program in any form, whether source code, intermediate language, machine code, or other forms. Computer program 125 may include system programs (e.g., an operating system), application programs, or any other types and forms of computer programs.

Programming environment 126 is an environment for programmers (also called "users" herein) to develop and debug their computer programs. Debugger 127 is a debugger that generates and recognizes ranked breakpoints 128. Threshold rank 129 is a rank that is preferably set by the user, the value of which determines whether a ranked breakpoint causes the execution of the computer program 125 to stop or not. Threshold rank 129 may be set directly by the user, or may be set by a user specifying a rank for one of the ranked breakpoints 128, such as a RunTo breakpoint.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
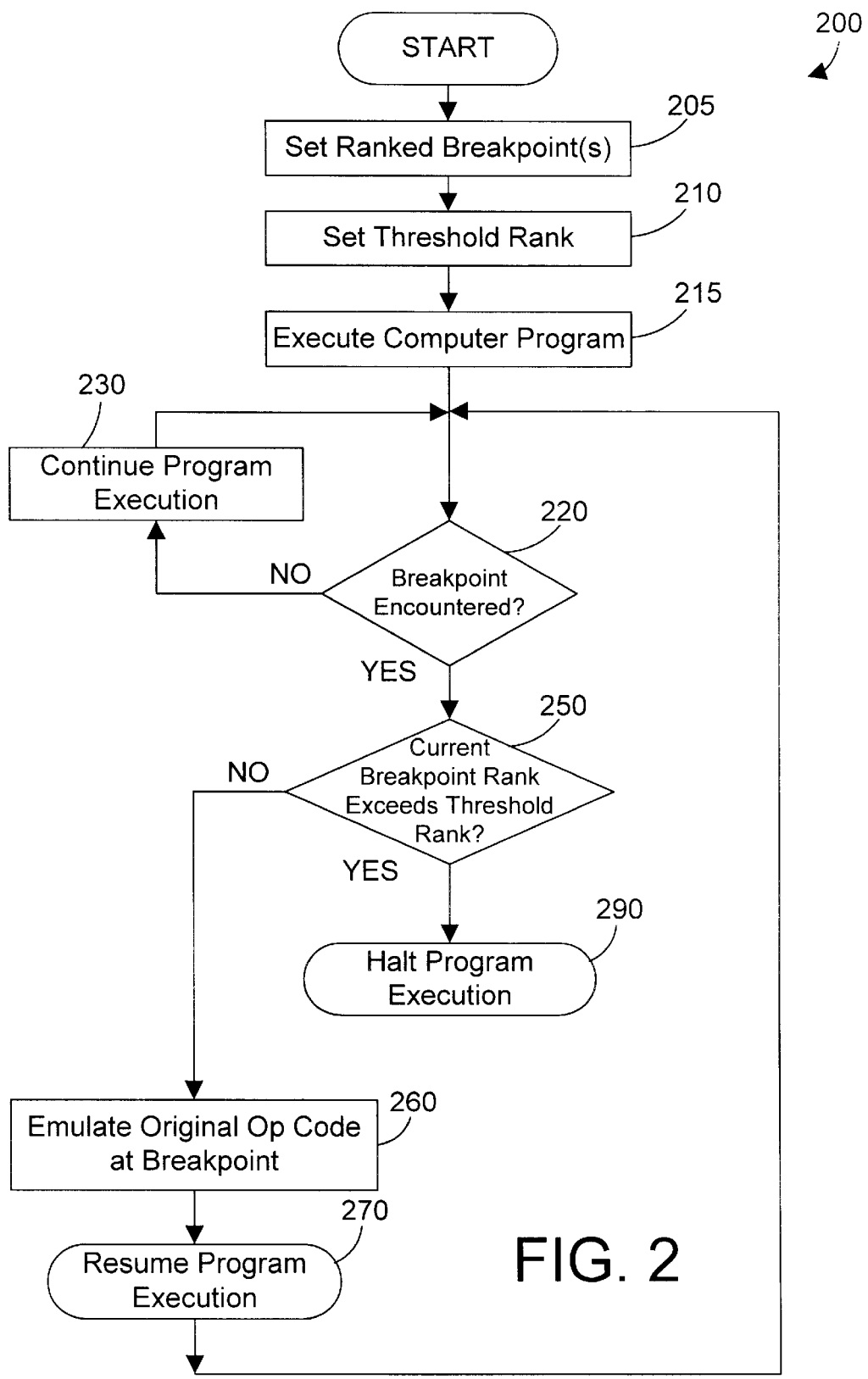
FIG. 2 is a flow diagram of a debug method in accordance with the preferred embodiments.

The remainder of this specification describes how ranked breakpoints 128 are used in a debugger 127. Referring to FIG. 2, a method 200 for debugging a computer program using ranked breakpoints begins by setting one or more ranked breakpoints 128 in computer program 125 (step 205). Next, method 200 sets a threshold rank (step 210). At this point, the computer program 125 is executed (step 215). If no breakpoint is encountered (step 220=NO), the execution of the program continues (step 230). When a breakpoint is encountered (step 220=YES), the breakpoint (referred to herein as the "current breakpoint") is checked to determine if the rank of the current breakpoint exceeds the threshold rank 129 (step 250). If so (step 250=YES), this means that a breakpoint of higher rank has been encountered, which halts the execution of the computer program (step 290). With the program execution halted, the user can then investigate the state of the program when the breakpoint was encountered to determine whether the program executed as expected.

If the rank of the current breakpoint does not exceed the threshold rank(step 250=NO), the current breakpoint needs to be ignored, because the current breakpoint is not of sufficient rank to merit halting execution of the program. To ignore the breakpoint, the original op code for that breakpoint is emulated (step 260), and the execution of the program is then resumed (step 270).

Method 200 provides a great deal more flexibility in debugging a computer program than is possible using prior art debugging techniques. The prior art requires manually and individually disabling or removing each breakpoint in order for a RunTo function to not halt. Method 200 instead sets a rank for the breakpoints, and compares the rank of the current breakpoint to the rank of the RunTo breakpoint. If the rank of the current breakpoint does not exceed the rank of the RunTo breakpoint, the current breakpoint is ignored without affecting the existence or state of the breakpoint.

Figure 3:
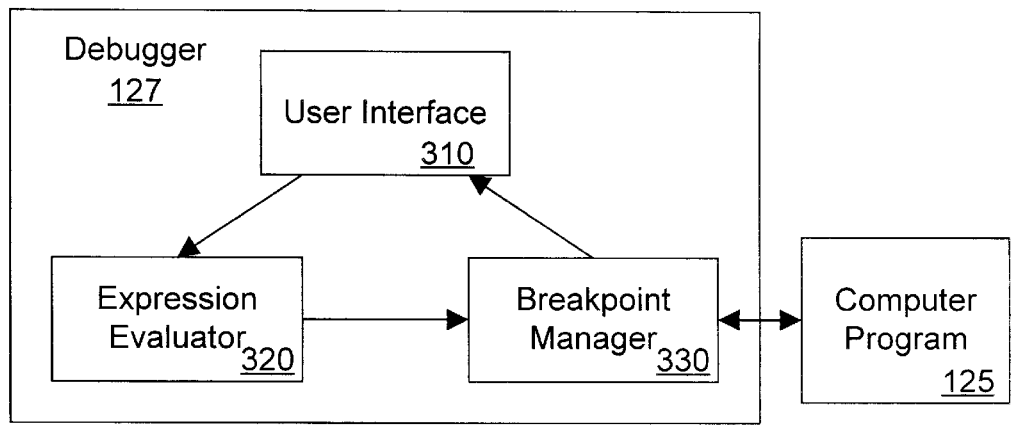
FIG. 3 is a block diagram showing a debugger and a computer program in one specific example implementation according to the preferred embodiments.

One particular implementation of a suitable debugger and method in accordance with the preferred embodiments is shown in FIGS. 3–9. This implementation assumes a RunTo function that has a corresponding rank that defines the threshold rank 129. In addition, this implementation uses ranked breakpoints and the rank of the RunTo function to determine whether or not program execution is halted when a breakpoint is encountered during the RunTo function depending on the rank of the breakpoint compared to the threshold rank of the RunTo function. Referring to FIG. 3, a suitable debugger 127 includes a user interface 310, an expression evaluator 320, and a breakpoint manager 330 that interacts with the computer program 125 that is being debugged. Note that many other functions may be included in debugger 127, but are not shown here to simplify the explanation herein.

Figure 4:
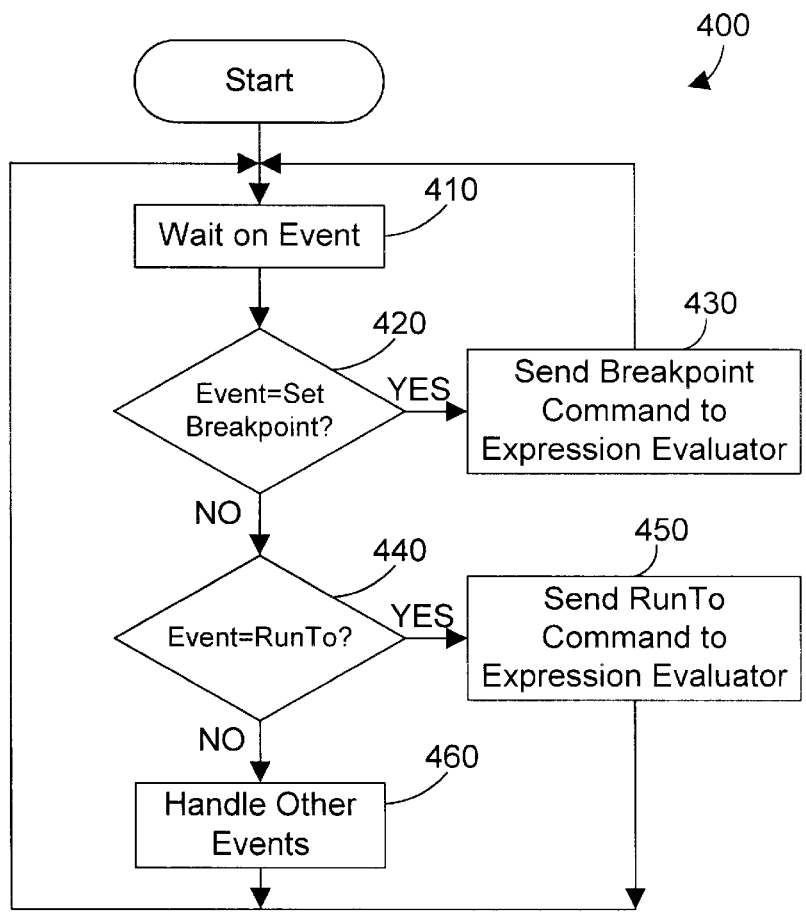
FIG. 4 is a flow diagram of a method implemented by the user interface of FIG. 3 that allows a user to set a breakpoint and to initiate a RunTo function.

FIGS. 4–9 relate to steps performed by debugger 127 while debugging computer program 125. A method 400 of FIG. 4 is a method executed by the user interface 310 of FIG. 3. The user interface waits on an event (step 410). Many events can be defined in a debugger, including a Set Breakpoint event and a RunTo event, among others. If the event is a Set Breakpoint event (step 420=YES), the user interface 310 sends a breakpoint command to the expression evaluator 320. If the event is not a set breakpoint event (step 420=NO), method 400 checks to see if the event is a RunTo event (step 440). If so (step 440=YES), the user interface 310 sends a RunTo command to the expression evaluator 320. If the event is not a RunTo event (step 440=NO), the user interface performs appropriate functions to handle the other defined events (step 460).

Figure 5:
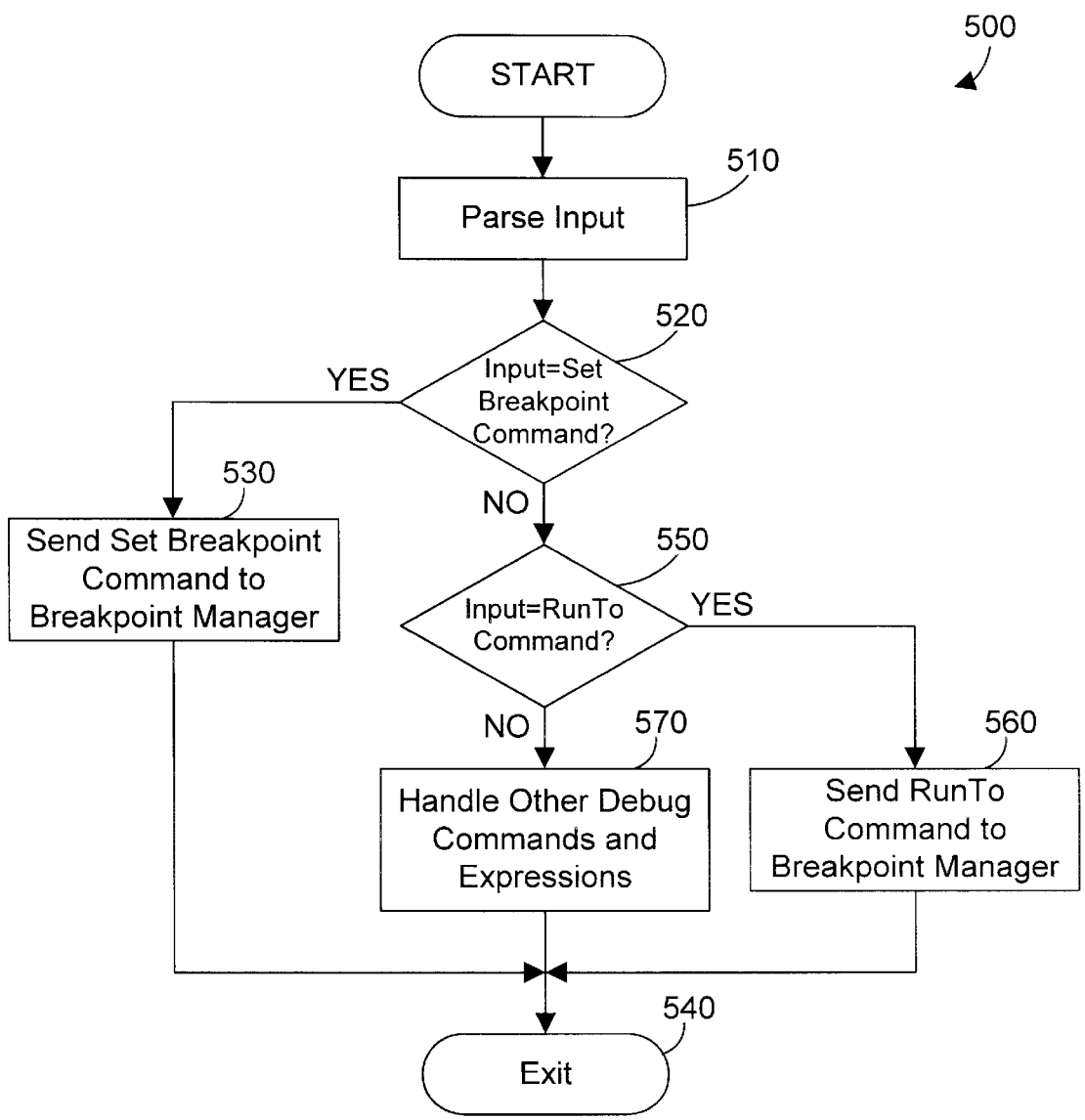
FIG. 5 is a flow diagram of a method implemented by the expression evaluator of FIG. 3 for evaluating input received from the user interface of FIG. 3.

When the expression evaluator 320 receives a command, such as a breakpoint command in step 430 or a RunTo command in step 450, the expression evaluator 320 performs the steps in method 500 shown in FIG. 5. First, the input is parsed (step 510) to determine which command is specified in the input. If the input is a Set Breakpoint command (step 520=YES), such as that sent in step 430 of FIG. 4, a Set Breakpoint command is sent to the breakpoint manager 330 (step 530), and method 500 then exits (step 540). If the input is not a Set Breakpoint command (step 520=NO), method 500 checks to see if the input is a RunTo command (step 550). If so (step 550=YES), method 500 sends a RunTo command to the breakpoint manager 330 (step 560). and then exits (step 540). If the input is not a RunTo command (step 550=NO), the expression evaluator takes appropriate action to handle the input as another debug command or expression (step 570), and then exits (step 540).

Referring to FIG. 6, a method 600 shows the steps that are performed by breakpoint manager 330 when a set breakpoint command is received, as in step 530 of FIG. 5. First, the op code in the program is replaced with an instruction that will generate an exception, such as a TRAP instruction (step 610). A record is then added to a breakpoint table (step 620) with information that identifies the address of the breakpoint, the original op code, whether the breakpoint is a regular breakpoint or a RunTo breakpoint, and the rank of the breakpoint. Note that this specific implementation assumes that regular breakpoints and RunTo breakpoints are both stored in the same breakpoint table. Of course, different tables for each breakpoint type could also be used. Once the record is added to the breakpoint table in step 620, method 600 exits to the user interface (step 630) to allow the user to define more breakpoints or to take other appropriate action.

Referring to FIG. 7, a method 700 shows the steps that are performed by breakpoint manager 330 when a RunTo command is received, as in step 550 of FIG. 5. First, the op code in the program is replaced with an instruction that will generate an exception, such as a TRAP instruction (step 710). A record is then added to the breakpoint table (step 720), similar to step 620 of FIG. 6. Once the record is added to the breakpoint table in step 720, a global RunToAction flag is set to TRUE (step 730), and method 700 the executes the program (step 740). The global RunToAction flag is a flag that is set when a RunTo breakpoint exists, and is cleared when no RunTo breakpoint exists. This global flag allows easily identifying whether or not a RunTo breakpoint exists without individually checking each breakpoint.

One suitable implementation of the breakpoint table referred to in FIGS. 6 and 7 is shown in FIG. 8. Breakpoint table 800 includes multiple records (e.g., 810A, 810B, 810C) that each have an address field 820, an op code field 830, a RunTo flag 840, and a rank flag 850. The address field 820 specifies the address in the computer program 125 where the breakpoint was inserted. Op code field 830 contains the original op code in the computer program 125 that was replaced by a TRAP or other suitable instruction that generates an exception. RunTo Flag field 840 contains a flag that specifies whether the breakpoint is a RunTo breakpoint or not. If the RunTo flag is set (equal to one), the breakpoint is a RunTo breakpoint. If the RunTo flag is cleared (equal to zero), the breakpoint is not a RunTo breakpoint. For this example, we assume that only two types of breakpoints exist, traditional breakpoints and RunTo breakpoints. The rank field 850 contains a rank for the breakpoint that is used in determining whether or not to stop execution of computer program 125 when the breakpoint is encountered.

Figure 9:
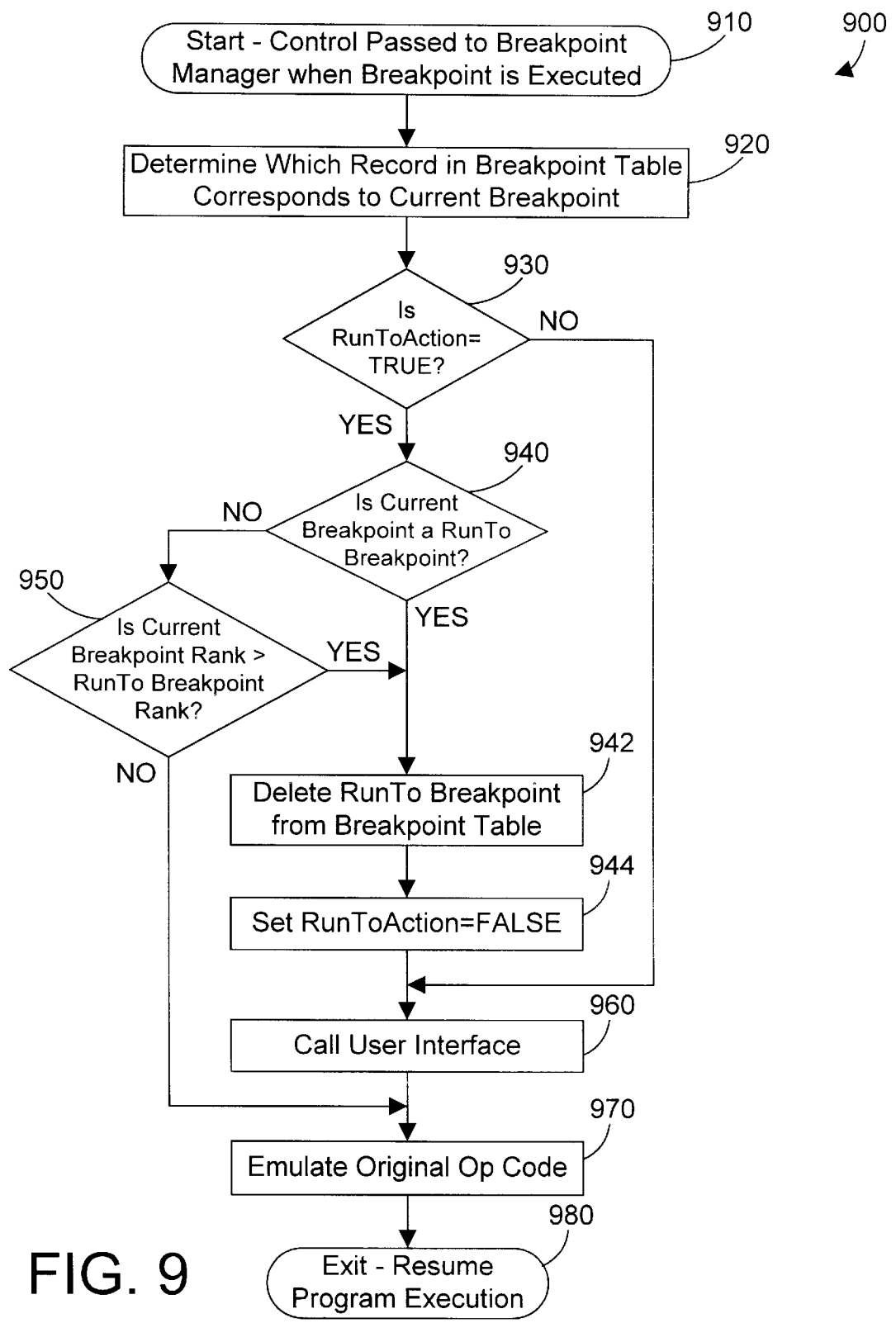
FIG. 9 is a flow diagram of a method 900 performed by the breakpoint manager of FIG. 3 when a breakpoint is encountered when executing the computer program.

Referring to FIG. 9, a method 900 is commenced by breakpoint manager 330 when a breakpoint is encountered during execution of the computer program 125 (step 910). First, the breakpoint manager 330 must determine which record in the breakpoint table corresponds to the current breakpoint. One suitable way to locate the appropriate record in the breakpoint table is to compare the address field 820 in the first record in the breakpoint table to the address of the current breakpoint. If the two do not match, the address field of the next record in the table is compared to the address of the current breakpoint. This process continues until the record in the breakpoint table 800 that corresponds to the current breakpoint is identified in step 920. Next, breakpoint manager 330 determines whether the RunToAction flag is set to TRUE (step 930). If the RunToAction flag is not set to TRUE (step 930=NO), this means that there are no RunTo breakpoint in the breakpoint table 800, so we know that the current breakpoint is a regular breakpoint. The user interface is then called (step 960) to provide output to the user regarding the state of the computer program 125 at the breakpoint. If the user wants to resume execution of the computer program, the user exits out of the user interface and the breakpoint manager 330 emulates the original op code (970) specified in the op code field 830 in the current breakpoint record, and resumes execution of the computer program 125 (step 980).

If the RunToAction flag is set to TRUE (step 930=YES), this means that there is a RunTo breakpoint in the breakpoint table, which means that breakpoint manager 330 must determine how to handle the current breakpoint. First, the RunTo field 840 of the current breakpoint record is examined to determine if the current breakpoint is a RunTo breakpoint (step 940). If the current breakpoint is a RunTo breakpoint (step 940=YES), the RunTo breakpoint is deleted from the breakpoint table (step 942), and the RunToAction flag is cleared (step 944). At this point the RunTo breakpoint has been successfully encountered, so the user interface is called (step 960) to show the user the state of the computer program at the RunTo breakpoint. Once the user is done examining the state of the computer program in the user interface, and wants to resume execution of the computer program, the original op code is emulated (step 970), and program execution resumes (step 980). Note that the entry in the breakpoint table 800 for the RunTo breakpoint was deleted in step 942, so step 970 requires that the value in the op code field 830 be preserved so it can be emulated later, as required.

If the current breakpoint is not a RunTo breakpoint (step 940=NO), the breakpoint manager then knows that the current breakpoint is a regular breakpoint. An important feature of the present invention is that a current breakpoint does not necessarily interrupt a RunTo function. Method 900 uses the value stored in the rank field 850 of the current breakpoint to determine whether or not to interrupt a RunTo function. If the current breakpoint rank is greater than the RunTo breakpoint rank (step 950=YES), we want to stop at this breakpoint and abort the RunTo function. The RunTo breakpoint is thus deleted from the breakpoint table (step 942), the RunToAction flag is cleared (step 944), and the user interface is called (step 960) to display the state of the computer program when the current breakpoint was encountered. Once the user has finished examining the breakpoint in the user interface, the user may elect to resume execution of the computer program, which causes the breakpoint manager to emulate the original op code for the current breakpoint (step 970), and to resume program execution (step 980).

In step 950, if the current breakpoint has a rank that is less than or equal to the rank of a RunTo breakpoint specified in breakpoint table 800 (step 950=NO), the current breakpoint is ignored by emulating the original op code for the current breakpoint (step 970), and execution of the computer program resumes (step 980) as if the breakpoint was not executed.

A specific example of a computer program and how ranked breakpoints provide enhanced debugging is shown in FIGS. 10–13. A sample source code program is shown in FIG. 10. This program simply assigns four different integer values to an integer variable xx. This program does not provide any useful computations or functions, but is sufficient to illustrate the concepts of the present invention. The source code in FIG. 10 is compiled into object code as shown in FIG. 11. Note that FIG. 11 actually contains two different representations of a compiled computer program, object code which is listed in the Op Code column, and corresponding machine-level instructions in the Assembly Code column, which are both shown for each address. Note that labels 1, 2, 3 and 4 are provided for convenience in referring to the instructions shown in FIGS. 11–13.

Each instruction in the source code of FIG. 10 is compiled into two corresponding machine-level instructions in FIG. 11. The instructions at label 1 include an add immediate instruction (ADDI) that specifies a register (R12), an offset (0), and the value (1) to add to the specified register. For the purpose of this discussion, we assume that all machine registers are initialized to zero before the code in FIG. 11 is executed, so adding a one to R12 results in a one being present in R12. Once the ADDI is complete, a store word (STW) instruction is executed to store the contents of register 12 into a memory location that corresponds to the variable xx. The address of the memory location is determined by taking the contents of register 31 (as designated in parentheses after the instruction), and adding the value FFE0 to calculate the effective address for the memory location. Note that the 0X preceding the FFE0 in the STW instructions in FIG. 11 designates that the address is a hexadecimal address. Each of the variable assignment instructions in FIG. 10 are implemented by adding an integer to the contents of a register that is initialized to zero, and then storing the register to the memory location corresponding to the variable.

The instructions in FIG. 11 can now be used to provide a very simple illustration of using ranked breakpoints in accordance with the preferred embodiments. Refering to FIG. 12, a single breakpoint may be placed in the program by replacing the ADDI instruction at label 3 with a TRAP instruction, which changes the op code for that instruction from a 39 for an ADDI instruction to a 3F for a TRAP instruction. Of course, the original op code for this instruction along with the corresponding instruction address in the computer program and the rank of the breakpoint are stored as a record 810C in the breakpoint table 800. We assume that the breakpoint in FIG. 12 is a regular breakpoint and not a RunTo breakpoint, so its RunTo Flag in the breakpoint table is set to FALSE. We assume that this computer program in FIG. 12 is now executed. The instructions at labels 1 and 2 are executed, and the TRAP instruction at label 3 is then executed. This TRAP causes an exception, which passes control to the breakpoint manager for execution of method 900 of FIG. 9. First, the breakpoints stored in breakpoint table 800 are examined to determine which corresponds to the breakpoint that was just executed. For the simple program in FIG. 12, only one breakpoint exists, so breakpoint table 800 would have a single record 810C with an address 00000470 that corresponds to the address of the instruction that generated the breakpoint. Step 920 in FIG. 9 thus identifies the record 810C corresponding to the breakpoint. For the simple example in FIG. 12, the single breakpoint is not a RunTo breakpoint (as shown by the RunTo Flag of record 810C being zero), so the RunToAction flag will be FALSE (step 930=NO). The user interface is then called (step 960) to allow the user to view the state of the computer program when the breakpoint at label 3 was encountered. When the user is done examining the results of the breakpoint, the user may resume execution of the computer program by emulating the original op code stored in the op code field 830 of record 810C (step 970), and then resuming execution of the computer program (step 980).

A more interesting case that takes advantage of the ranking of breakpoints is shown in FIG. 13. In FIG. 13, two breakpoints have been set, a regular breakpoint with a rank of 10 at label 1 using method 600 of FIG. 6, and a RunTo breakpoint with a rank of 10 at label 4 using method 700 of FIG. 7. These breakpoints are represented in breakpoint table 800 as records 810A and 810B, respectively. When the program in FIG. 13 is executed, the first instruction is a TRAP that generates an exception and gives control to the breakpoint manager. Referring to FIG. 9, the breakpoint manager first determines which record in the breakpoint table corresponds to the current breakpoint (step 920). The addresses of the breakpoint records 810A and 810B are examined, and step 920 determines that the address of record 810A matches the address of the current breakpoint. In step 930, the breakpoint manager sees that the RunToAction flag is set to true (because step 730 was executed in setting the RunTo breakpoint at label 4). The current breakpoint at label 1 is not a RunTo breakpoint, as indicated by the RunTo flag of record 810A being zero, so the answer to step 940 is NO. Next, step 950 determines whether the rank of the current breakpoint is greater than the rank of the RunTo breakpoint. The rank of the current breakpoint is 10, as shown by the rank field 850 in record 810A. The rank of the RunTo breakpoint is 10, as shown by the rank field 850 in record 810B. So the answer to step 950 is NO, which causes the breakpoint manager to emulate the original op code in the op code field of record 810A (step 970), and to resume execution of the computer program (step 980). By emulating the original op code and resuming program execution, the breakpoint is effectively ignored.

When the next breakpoint is encountered by executing the TRAP instruction at label 4, an exception is generated and control is again given to the breakpoint manager to perform method 900. Step 920 determines from the address of the current breakpoint that record 810B in breakpoint table 800 corresponds to the current breakpoint. The RunToAction flag is still set to TRUE (step 930=YES). Step 940 determines from the RunTo Flag field of record 810B that the current breakpoint is a RunTo breakpoint. As a result, the RunTo breakpoint record 810B is deleted from the breakpoint table (step 942), the RunToAction flag is set to FALSE (step 944), and the user interface is called to present the state of the computer program to the user. This sequence of steps indicates that the RunTo breakpoint was successfully encountered. Note that after the user is finished examining the state of the computer program in the user interface, the user may continue execution of the computer program, which causes the breakpoint manager to emulate the original op code (step 970) and resume program execution (step 980).

Because the rank of the breakpoint at label 1 in FIG. 13 is the same as the rank of the RunTo breakpoint at label 4, the regular breakpoint at label 1 is ignored when the RunTo function is initiated by the user clicking on the ADDI instruction at label 4. However, a different result can be achieved by appropriately setting the rank of each regular breakpoint and the rank of the RunTo breakpoint. For this particular example, we assume that a default rank of 10 is assigned to all breakpoints, including RunTo breakpoints. This means that all breakpoints with a default rank are ignored when a RunTo breakpoint is set. However, any breakpoint can be set with a rank higher or lower than the default. For example, if the breakpoint at label 1 of FIG. 13 were an important breakpoint, its rank might be set to 15. If this were the case, when the first breakpoint at label 1 is encountered, the breakpoint manager in executing method 900 would determine that the current breakpoint is not a RunTo breakpoint (step 940=NO), and would determine that the rank of the current breakpoint (15) is greater than the rank of the RunTo breakpoint (10) (step 950=YES), s o the RunTo breakpoint is deleted from the breakpoint table in step 942, the RunToAction flag is set to false (step 944), and the user interface is called (step 960) to show the user the results of the current breakpoint. Thus, a higher-ranked breakpoint can preempt a lower-ranked RunTo function. Another way to select which breakpoints are ignored and which are executed is by setting the rank of the RunTo breakpoint. For example, let's assume that several regular breakpoints are all established with a default rank of 10. If the user wants to break at each breakpoint, the user may specify a RunTo breakpoint with a rank of 5, which would cause the RunTo to be aborted at the first breakpoint with a rank over 5. If the user wants to break at breakpoints that have a rank greater than the default, the user can set the RunTo breakpoint rank to the default, which causes a break at the first breakpoint with a higher rank. If the user sets several different rank levels in the breakpoint, the user can then selectively set the rank of the RunTo breakpoint to specifically encounter or avoid groups of breakpoints of a certain rank.

Note that the flow of FIG. 9 assumes for the purpose of illustration that encountering a breakpoint with a higher rank during a RunTo function causes the RunTo to be aborted (see steps 942 and 944). However, it is equally within the scope of the preferred embodiments to suspend the RunTo function, evaluate the higher-ranked breakpoint, and then resume the RunTo function.

The discussion herein concentrates on the use of ranked breakpoints when a RunTo function is performed. However, the ranking of breakpoints may be useful in other debugging functions besides the RunTo function. For example, let's assume that a user sets up several breakpoints with a rank of 5, several with a rank of 10, several with a rank of 15, and several with a rank of 20. The user could then invoke a "conditional breakpoint" function, specifying a threshold rank, that would ignore breakpoints with an equal or lesser rank, while only stopping at breakpoints that have a higher rank.

The preferred embodiments assume that only breakpoints with a higher rank will be executed, while breakpoints with a rank that is less than or equal to a specified rank will be ignored. However, this selection of rank relationships is for the purpose of illustration, and should not be construed as limiting. One could just as easily specify that breakpoints with a rank that is greater than or equal to the specified rank are executed, while breakpoints with ranks lesser than the specified rank are ignored. In addition, any suitable heuristic could be employed to determine when a rank is sufficient to cause a breakpoint to be executed and when a rank is not sufficient to cause the breakpoint to be executed.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:

at least one processor;

a memory coupled to the at least one processor;

a computer program residing in the memory; and at least one breakpoint in the computer program t hat ha s a rank, wherein a debugger halts execution of the computer program when a first ranked breakpoint is encountered during execution of the computer program only if the rank of the first ranked breakpoint has a predetermined numerical relationship to a predetermined threshold rank.

2. The apparatus of claim 1 wherein the predetermined threshold rank is the rank of a second ranked breakpoint that is selected by a user.

3. The apparatus of claim 2 wherein the second ranked breakpoint comprises a RunTo breakpoint.

4. The apparatus of claim 1 wherein the debugger stops execution of the computer program if the rank of the first ranked breakpoint is greater than the predetermined threshold rank.

5. An apparatus comprising:

at least one processor;

a memory coupled to the at least one processor;

a computer program residing in the memory;

a debugger residing in the memory, the debugger defining a first ranked breakpoint in the computer program;

the debugger further defining a ranked RunTo function at a selected instruction in the computer program;

wherein the debugger determines whether to stop execution of the computer program when the first ranked breakpoint is encountered during execution of the computer program depending on the rank of the first ranked breakpoint compared to the rank of the RunTo function.

6. An apparatus comprising:

a computer program residing in a memory;

means for setting a first ranked breakpoint in the computer program;

means for specifying a threshold rank;

means for halting execution of the computer program at the first ranked breakpoint only if the first ranked breakpoint has a rank with a predetermined numerical relationship to the threshold rank.

7. A method for debugging a computer program comprising the steps of:

(1) setting a first ranked breakpoint in the computer program;

(2) specifying a threshold rank;

(3) executing the computer program; and (4) halting the execution of the computer program at the first ranked breakpoint only if the first ranked breakpoint has a rank with a predetermined numerical relationship to the threshold rank.

8. The method of claim 7 wherein the step of specifying the threshold rank comprises the step of defining a second ranked breakpoint with a rank that is the threshold rank.

9. The method of claim 8 wherein the second ranked breakpoint comprises a RunTo breakpoint.

10. The method of claim 7 wherein step (2) comprises the steps of:

(2A) selecting an instruction in the computer program;

(2B) defining a RunTo function with the threshold rank at the selected instruction; and (2C) initiating the RunTo function to begin execution of the computer program in step (3).

11. The method of claim 7 wherein step (2B) comprises the steps of:

(2B1) specifying the threshold rank of the RunTo function; and (2B2) defining a RunTo breakpoint at the selected instruction by saving the selected instruction and by replacing the selected instruction with an instruction that generates a breakpoint.

12. The method of claim 7 wherein step (4) halts execution of the computer program if the rank of the first ranked breakpoint is greater than the predetermined threshold rank.

13. A method for debugging a computer program, the method comprising the steps of:

(1) setting a first ranked breakpoint in the computer program;

(2) selecting an instruction in the computer program;

(3) initiating a RunTo function at the selected instruction that causes the computer program to begin execution;

(4A) if the selected instruction is encountered before the first ranked breakpoint, indicating successful completion of the RunTo function;

(4B) if the first ranked breakpoint is encountered before the selected instruction:

(4B1) if the rank of the first ranked breakpoint is greater than the rank of the RunTo function, halting the execution of the computer program;

(4B2) if the rank of the first ranked breakpoint is less than or equal to the rank of the RunTo function, ignoring the first ranked breakpoint and continuing execution of the computer program.

14. The method of claim 13 wherein step (4B2) further aborts the RunTo function if the rank of the first ranked breakpoint is greater than the rank of the RunTo function.

15. A program product comprising:

a debugger mechanism that defines at least one breakpoint that has a rank in a computer program, wherein the debugger halts execution of the computer program when a first ranked breakpoint is encountered during execution of the computer program only if the rank of the first ranked breakpoint has a predefined numerical relationship to a predetermined threshold rank; and computer readable signal bearing media bearing the debugger mechanism.

16. The program product of claim 15 wherein the signal bearing media comprises recordable media.

17. The program product of claim 15 wherein the signal bearing media comprises transmission media.

18. The program product of claim 15 wherein the predetermined threshold rank is the rank of a second ranked breakpoint that is selected by a user of the debugger mechanism.

19. The program product of claim 18 wherein the second ranked breakpoint comprises a RunTo breakpoint.

20. The program product of claim 15 wherein the debugger stops execution of the computer program if the rank of the first ranked breakpoint is greater than the predetermined threshold rank.

21. A program product comprising:

(A) a debugger mechanism that defines a first ranked breakpoint in a computer program and a ranked RunTo function at a selected instruction in the computer program, wherein the debugger mechanism determines whether to stop execution of the computer program when the first ranked breakpoint is encountered during execution of the computer program depending on the rank of the first ranked breakpoint compared to the rank of the RunTo function; and (B) computer readable signal bearing media bearing the debugger mechanism.

22. The program product of claim 21 wherein the signal bearing media comprises recordable media.

23. The program product of claim 21 wherein the signal bearing media comprises transmission media.

* * * * *